May 2, 1961 F. E. BARR ET AL 2,982,410
SCREENING MACHINE FOR GRANULAR MATERIALS
Filed Oct. 27, 1958

INVENTORS
FREDERICK E. BARR
AND WENDEL S. BLANDING
BY
Clarence R. Oatly Jr.
ATTORNEY

United States Patent Office 2,982,410
Patented May 2, 1961

2,982,410

SCREENING MACHINE FOR GRANULAR MATERIALS

Frederick E. Barr, Corning, and Wendell S. Blanding, Painted Post, N.Y., assignors to Corning Glass Works, Corning, N.Y., a corporation of New York Filed Oct. 27, 1958, Ser. No. 769,797

5 Claims. (Cl. 209—245)

The present invention relates to apparatus particularly useful in the precision screening of high density granular and/or powdered materials.

In the preparation of high density granular materials for specialized uses, such for example as mixtures of solder glass compositions used to seal color television tube funnels and panels to one another, the quality and uniformity of seals obtained are largely dependent upon characteristics of the mixtures contingent on the screening process, since the rate of devitrification of such seals at a given temperature is a function of the surface area of the glass and, therefore, the average particle size.

Applicants, after an extensive survey of the commercial screening equipment available and after experimental use of that which appeared most likely to serve their purpose, found the same either to fail to do a satisfactory screening job or had a rate of output wholly inadequate for practicable commercial use.

According to the invention a screening apparatus has been provided wherein these deficiencies are overcome. Such apparatus involves supporting a screen, over a funnel for gathering the screened materials, arranged in fixed relation with a resiliently mounted plate having a central aperture through which the tubular portion of the funnel projects. Vibrator means secured to such plate serves to agitate it and the supported screen. Preferably such vibrator means comprises two vibrators each embodying a closed cylinder whose cylindrical wall has a circular track formed thereabout over which a steel ball is propelled at high speed by passage of compressed air tangentially to such track, such air being exhausted through apertures in one end of the cylinder. When such vibrators are used according to the invention they are arranged on the underside of such screen support plate on two opposite sides of the tube portion respectively of such funnel with their bores in alignment, but with their air entrances faced in opposite directions, so as to impart to the screen opposing motions found to be particularly effective to agitate the screen in an efficient manner. Moreover, according to the invention the tubular portion of the funnel passes through the field of an electro-magnet so that magnetic particles in the screened material will adhere to the inner surface of such portion. Also the lower end of such tubular portion is provided with an assembly from which may be hung or about which may be tied a bag for collecting the screened material and which shields the bag from accumulation of foreign matter from above. Additionally the invention embodies means for feeding unscreened materials to the screen in a predetermined fashion over the major surface area thereof. This latter means embodies a vibrator supported hopper having laterally extended therefrom a shallow closed pan projected over the major portion of the screen and having bottom apertures for the feeding of materials thereto distributed in increasingly spaced relation from one another in the direction of the hopper and preferably so distributed that each aperture has a path over an imperforate surface of the pan bottom for the movement of granular material from the hopper thereto.

For a better understanding of the invention reference will be hereinafter made to the accompanying drawings.

In the drawings, Fig. 1 is a top plan view of an apparatus embodying the invention.

Figure 1:
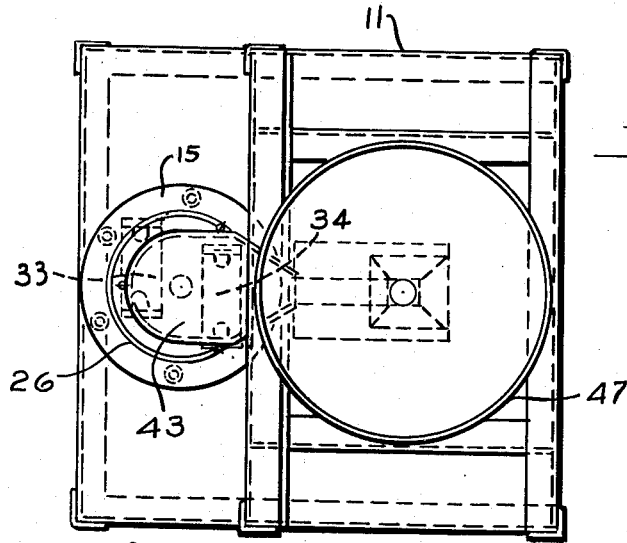
Figure 4:
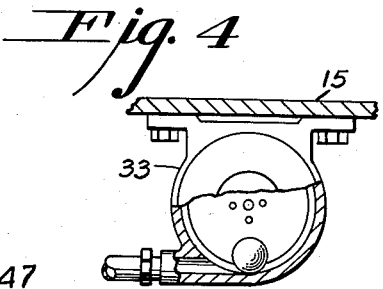
Fig. 4 is an elevational view partly in section of one vibrator of the apparatus and a fragment of the plate to which it is attached.

Referring to the drawing in detail, the numeral 11 designates a wheeled carriage supporting the respective operative elements of the apparatus. A circular plate 15 is resiliently supported on the carriage 11 by means of a number of hose sections, such as 18, clamped at their upper and lower ends, respectively, to stub shafts, such as 20, depending from the plate 15 and similar stub shafts 21 projecting upwardly from a rigidly supported annular plate 12.

Rigidly mounted on the plate 15, is a screen funnel support 25 having a tubular portion 14 projected through a central aperture through plate 15. A funnel 28, for recipet of the screened materials, is clamped between support 25 and screen 26 by means of a clamping ring 27 and has its depending tubular portion 29 passing through plate 12. The lower end of such tubular portion 29 has fixed thereto a shield assembly comprising a tube 30 to the upper end of which is secured an outwardly extending downwardly sloping bag shield 31. The lower end of tube 30 is provided with a beaded rim 32 about which the open end of a bag (not shown) may be necked for receipt of the screened material. The shield 31 overlays such a bag and prevents the accumulation thereover of airborne foreign matter that might otherwise accumulate on the bag and find its way therein upon removal of the bag from the tube 30.

Attached to the underside of plate 15, on two opposite sides of the tubular portion 29 of funnel 28 are air operated vibrators 33 and 34 with their air entrances, such as 35, faced in opposite directions. As will be understood these vibrators are operated by compressed air, supplied to their respective entrances, preferably at approximately 100 p.s.i.

Arranged below plate 12 is an electromagnet 36 mounted with its magnetic field about the tubular portion 29 of funnel 28.

Figure 3:
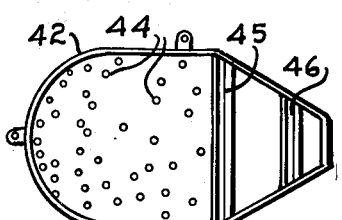
Fig. 3 is a top plan view of a material feeding pan embodied in the apparatus.
Figure 2:
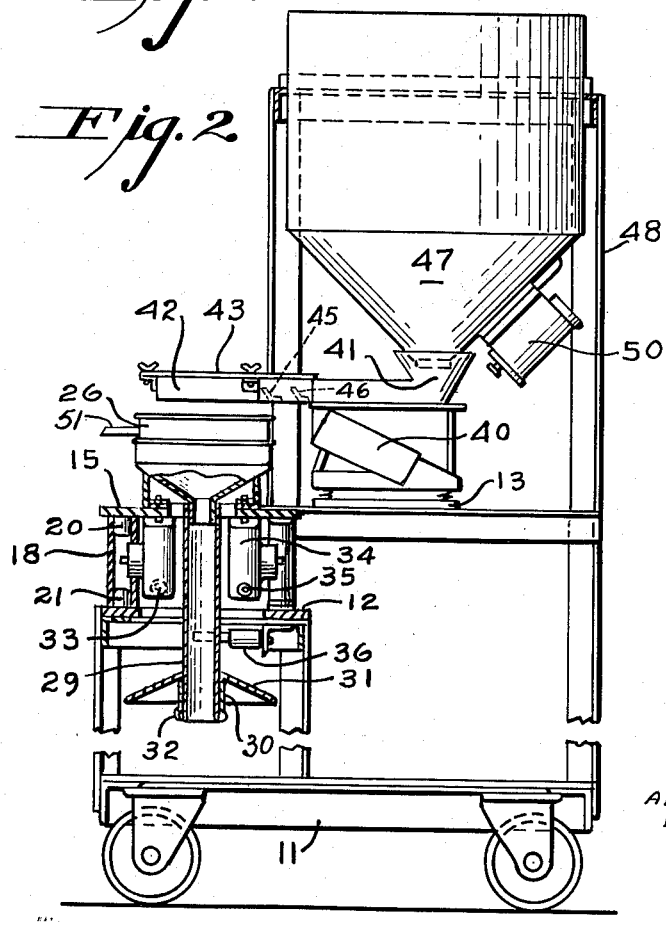
Fig. 2 is a side elevation, partly in section, of the apparatus of Fig. 1.
Figure 2A:
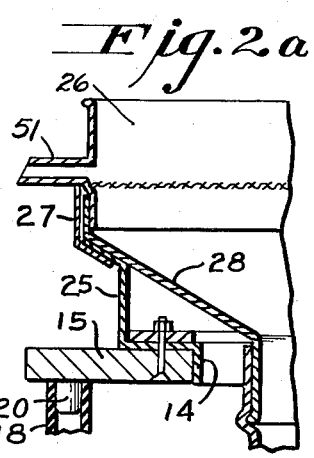
Fig. 2a is an enlarged sectional view of a fragment of the apparatus.

Also, mounted on the carriage is a base plate 13 upon which a magnetic vibrator 40 is resiliently supported. This vibrator carries a material feeding hopper 41 and from which a material feeding pan 42 projects over the screen 26. Pan 42 is provided with a removable cover 43. As will be observed from Fig. 3, wherein cover 43 has been omitted, the bottom of pan 42 has a number of apertures or passages, such as 44, therethrough for feeding of unscreened material onto screen 26. As will also be observed such passages are relatively closely spaced in the pan end remote from the hopper and are progressively spaced farther apart in the direction of the hopper so as to aid in the efficient distribution of such materials over pre-selected areas of screen 26. To assure clogging of the pan apertures thereby, the pan 42 is provided with transverse baffle 45 and 46 slanted toward the end of the pan most remote from the hopper and over which such materials must pass before arriving at the apertured area of the pan. For continuous operation there is also preferably provided a large volume hopper such as 47, for feeding material to the hopper 41, suspended from carriage uprights such as 48, and having a suitable vibrator 50 attached thereto.

In the operation of the apparatus electromagnet 36 is energized and the respective vibrators 33, 34, 40, and 50 set into operation. The materials that cannot pass through screen 26 will for the most part issue from a side trough 51 thereof. Other materials that tend to remain on the screen can readily be removed therefrom from time to time by a hose connected to an industrial type vacuum cleaner.

After the operations are discontinued, to disconnect a bag of screened materials from the tube 30, electromagnet 36 may be temporarily de-energized to release from the tube any magnetic material that may have been accumulated during the preceding screening operation.

What is claimed is:

1. In a mechanism suitable for use in screening high density granular and powdered materials, uprights; a large volume funnel bottomed hopper, for supplying materials to be screened, supported from such uprights; a vibrator fixed to the hopper bottom, a material feeding hopper arranged under the bottom of said funnel bottomed hopper, a vibrator fixed to the material feeding hopper, a pan associated with the feeding hopper having a perforate bottom for feeding material to a screen, a resiliently supported annular plate arranged beneath said pan, a screen arranged over the upper side of said plate fixed with respect to a material feeding funnel arranged between said screen and plate and in part depending through such plate, and vibrators attached to the under side of said plate on two opposite sides of the depending portion of said funnel.

2. In a mechanism suitable for use in screening high density granular and powdered materials, a horizontally disposed plate having a centrally located vertical passage therethrough, means resiliently supporting said plate in a plurality of places in its boundary region, a tubulated funnel supported on said plate and having its tubular portion depending therethrough, associated means for clamping a screen over the mouth of said funnel, and vibrator means attached to the underside of said plate comprising a pair of generally circular housings each with an operating air supply line extending from an arcuate region thereof, said housings being mounted in parallel relation with their supply lines in reversed relation with respect to one another so that the vibratory forces created by each are counter to those created by the other.

3. In a mechanism suitable for use in screening high density granular and powdered materials, a horizontally disposed plate having a centrally located vertical passage therethrough, means resiliently supporting said plate in a plurality of places in its boundary region, a tubulated funnel supported on said plate and having its tubular portion depending therethrough, with a beaded edge about its lower end for aiding in the attachment thereabout of a screened material receiving bag, and a downwardly sloping bag shield arranged around said tube.

4. In a mechanism suitable for use in screening high density granular and powdered materials, a horizontally disposed plate having a centrally located vertical passage therethrough, means resiliently supporting said plate in a plurality of places in its boundary region, a tubulated funnel supported on said plate and having its tubular portion depending therethrough, associated means for clamping a screen over the mouth of said funnel, and a vibrator supported hopper having a shallow pan associated therewith positioned over the major area of such screen, said pan having apertures through its bottom spaced longitudinally thereof from one another at progressively shorter distances as their distance from the hopper becomes greater and being spaced transversely of the pan so that the natural line of movement of the granular material to an aperture is over an imperforate surface of the pan bottom.

5. A mechanism as defined by claim 4 wherein said shallow pan is provided with a baffle transversely thereof in the region between its apertured portion and the hopper, said baffle extending upward from the container bottom a short distance compared to the container height and being slanted in the direction of material flow from the hopper.

References Cited in the file of this patent

UNITED STATES PATENTS 1,962,734     Dupre _____ June 12, 1934

FOREIGN PATENTS 775,938     France _____ Dec. 7, 1933

UNITED STATES PATENT OFFICE
CERTIFICATE OF CORRECTION

May 2, 1961

Patent No. 2,982,410

Frederick E. Barr et al.

It is hereby certified that error appears in the above numbered patent requiring correction and that the said Letters Patent should read as corrected below.

Column 2, line 65, after "assure" insert -- against undue packing of the materials and possible --; line 67, for "baffle" read -- baffles --.

Signed and sealed this 11th day of September 1962.

(SEAL)
Attest:

ERNEST W. SWIDER
Attesting Officer

DAVID L. LADD
Commissioner of Patents